(12) United States Patent
Gao

(10) Patent No.: US 12,169,979 B2
(45) Date of Patent: Dec. 17, 2024

(54) FINGERPRINT-ON-DISPLAY COLLECTION METHOD AND ELECTRONIC DEVICE

(71) Applicant: HONOR DEVICE CO., LTD., Guangdong (CN)

(72) Inventor: Weiqiang Gao, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/549,687

(22) PCT Filed: Aug. 26, 2022

(86) PCT No.: PCT/CN2022/114981
§ 371 (c)(1),
(2) Date: Sep. 8, 2023

(87) PCT Pub. No.: WO2023/051120
PCT Pub. Date: Apr. 6, 2023

(65) Prior Publication Data
US 2024/0161537 A1 May 16, 2024

(30) Foreign Application Priority Data
Sep. 30, 2021 (CN) .......................... 202111161475.5

(51) Int. Cl.
*G06K 9/00* (2022.01)
*G06V 10/141* (2022.01)
(Continued)

(52) U.S. Cl.
CPC ........ *G06V 40/1318* (2022.01); *G06V 10/141* (2022.01); *G06V 10/993* (2022.01)

(58) Field of Classification Search
CPC ............. G06V 40/1318; G06V 10/141; G06V 10/993; G06V 10/147
See application file for complete search history.

(56) References Cited

U.S. PATENT DOCUMENTS 10,579,853 B2   3/2020  Zuo et al.
2021/0224505 A1* 7/2021 Liu ...................... G06V 10/147

FOREIGN PATENT DOCUMENTS

CN    107690653 A    2/2018
CN    110945526 A    3/2020
(Continued)

OTHER PUBLICATIONS

Tan et al., "Adaptive adjusting fingerprint acquisition algorithm based on FPS200," Science Technology and Engineering, Jul. 2008, 8(14): 1-5 (with English abstract).
(Continued)

*Primary Examiner* — Abdul-Samad A Adediran
(74) *Attorney, Agent, or Firm* — Fish & Richardson P.C.

(57) ABSTRACT

A fingerprint-on-display collection method and an electronic device are provided. In the method, a first interface and a screen brightness related parameter are obtained, where the screen brightness related parameter is a parameter that affects screen brightness in the electronic device, and the first interface is an interface displayed on a screen when fingerprint collection is performed; first exposure time is calculated based on the first interface and the screen brightness related parameter; and fingerprint collection is performed based on the first exposure time to obtain a first fingerprint image. This application can improve an adjustment speed of exposure time, thereby improving a speed at which the electronic device collects a correctly exposed fingerprint image, and improving user experience.

10 Claims, 10 Drawing Sheets

(51) Int. Cl.
*G06V 10/98* (2022.01)
*G06V 40/13* (2022.01)

(56) References Cited

FOREIGN PATENT DOCUMENTS

| CN | 111783747 A | 10/2020 |
|---|---|---|
| CN | 112949600 A | 6/2021 |
| CN | 113191198 A | 7/2021 |
| CN | 113361416 A | 9/2021 |
| WO | 2020108225 A1 | 6/2020 |
| WO | 2021077393 A1 | 4/2021 |

OTHER PUBLICATIONS

Kuzu et al., "On-the-fly finger-vein-based biometric recognition using deep neural networks," IEEE Transactions on information Forensics and Security, Feb. 3, 2020, 15:2641-54.

\* cited by examiner

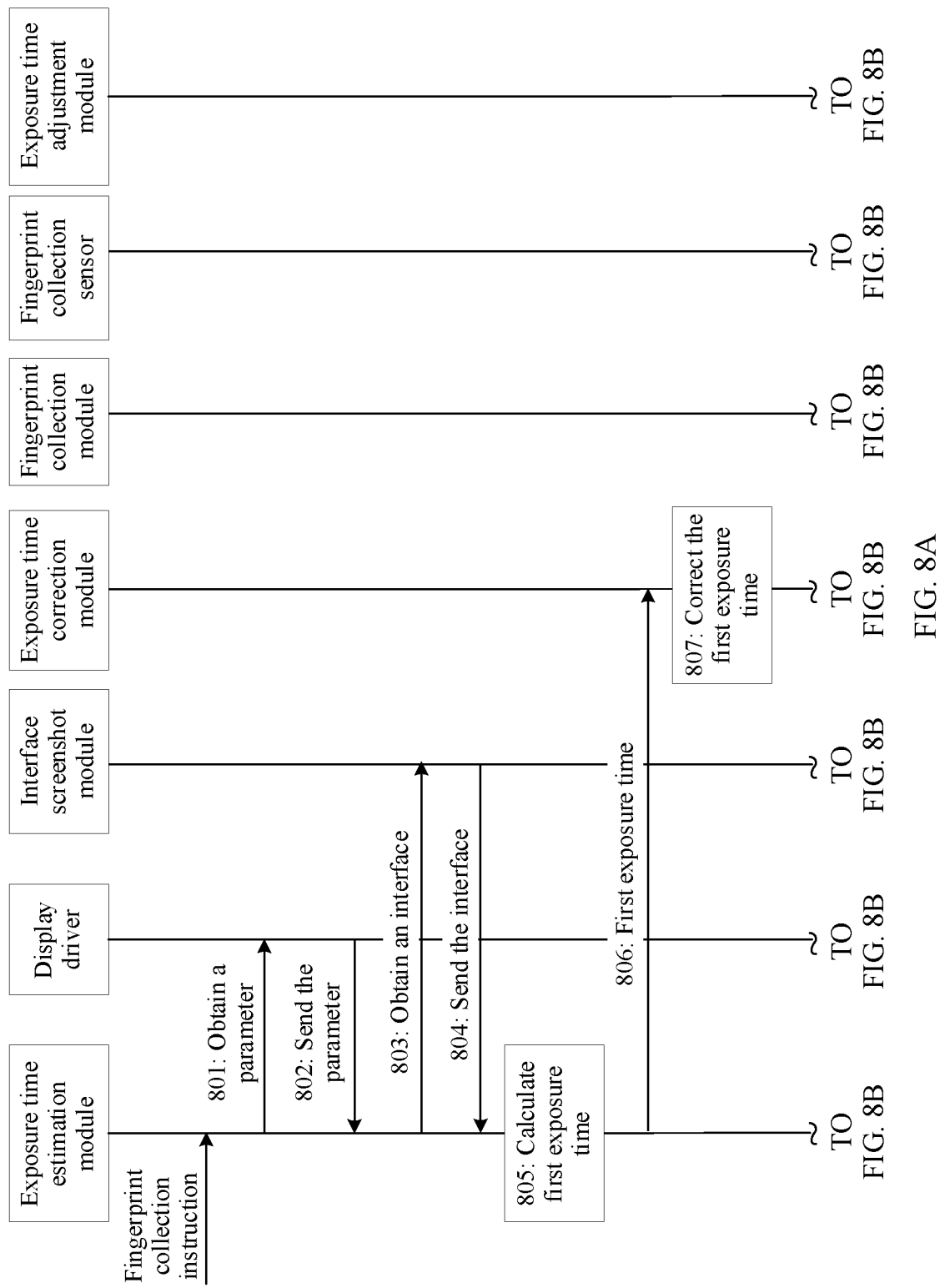

FINGERPRINT-ON-DISPLAY COLLECTION METHOD AND ELECTRONIC DEVICE

CROSS-REFERENCE TO RELATED APPLICATIONS

This application is a National Stage of International Application No. PCT/CN2022/114981, filed on Aug. 26, 2022, which claims priority to Chinese Patent Application No. 202111161475.5, filed on Sep. 30, 2021, both of which are hereby incorporated by reference in their entireties.

TECHNICAL FIELD

This application relates to the field of intelligent terminal technologies, and in particular, to a fingerprint-on-display collection method and an electronic device.

BACKGROUND

At present, in fingerprint-based authentication, fingerprints of users may be collected by optical fingerprint-on-display collection. Optical fingerprint-on-display collection includes two collection methods: collection with fixed exposure time and collection with automatic adjustment of exposure time. In the fingerprint collection method with fixed exposure time, a correctly exposed fingerprint image cannot be obtained within the fixed exposure time in a light source fluctuation scenario, a strong light scenario, and another scenario. This affects identity authentication efficiency. In the fingerprint collection method with automatic adjustment of the exposure time, an exposure time adjustment rate is slow, and a speed of obtaining a correctly exposed fingerprint image is slow. This also affects identity authentication efficiency.

SUMMARY

This application provides a fingerprint-on-display collection method and an electronic device, to improve a speed at which the electronic device obtains a correctly exposed fingerprint image, thereby improving user experience.

According to a first aspect, an embodiment of this application provides a fingerprint-on-display collection method, applied to an electronic device and includes: obtaining a first interface and a screen brightness related parameter, where the screen brightness related parameter is a parameter that affects screen brightness in the electronic device, and the first interface is an interface displayed on a screen when fingerprint collection is performed; calculating first exposure time based on the first interface and the screen brightness related parameter; and performing fingerprint collection based on the first exposure time to obtain a first fingerprint image. In this method, when the first exposure time is calculated, an interface factor and a parameter factor that affect the exposure time are considered, so that the calculated first exposure time can reach or approach exposure time corresponding to correct exposure, thereby improving a speed at which the electronic device obtains a correctly exposed fingerprint image and improving user experience.

In a possible implementation, the screen brightness related parameter includes at least one of the following parameters: a brightness bar setting order, a DBV order of a display driver IC, an ELVSS voltage, and a display mode.

In a possible implementation, the performing fingerprint collection based on the first exposure time to obtain a first fingerprint image includes: correcting the first exposure time based on a preset correction parameter to obtain second exposure time, where the correction parameter includes exposure time required for a standard product to collect a fingerprint when a fingerprint light spot is brightest, exposure time required for the standard product to collect a fingerprint when a fingerprint light spot is darkest, exposure time required for the electronic device to collect a fingerprint when a fingerprint light spot is brightest, and exposure time required for the electronic device when a fingerprint light spot is darkest; and performing fingerprint collection based on the second exposure time to obtain the first fingerprint image. In this method, the first exposure time is corrected based on an exposure performance difference between the electronic device and the standard product to obtain the second exposure time, and fingerprint collection is performed based on the second exposure time. In this way, the second exposure time used by the electronic device for fingerprint collection for the first time reaches or approaches the exposure time corresponding to the correct exposure, so that the electronic device can directly obtain the correctly exposed fingerprint image under a normal condition, thereby improving the speed at which the electronic device obtains the correctly exposed fingerprint image and improving user experience.

In a possible implementation, the method further includes: detecting an exposure degree of the first fingerprint image; when it is determined based on the exposure degree that exposure of the first fingerprint image is inappropriate, adjusting the second exposure time to obtain third exposure time; and performing fingerprint collection based on the third exposure time to obtain a second fingerprint image. In the method, in an extreme case, when the second exposure time is not the exposure time corresponding to the correct exposure, the second exposure time can be adjusted to obtain the exposure time corresponding to the correct exposure, and then to obtain the correctly exposed fingerprint image.

In a possible implementation, the screen brightness related parameter includes the brightness bar setting order, the DBV order of a display driver IC, the ELVSS voltage, and the display mode. The calculating first exposure time based on the first interface and the screen brightness related parameter includes: mapping an RGB value of each pixel in the first interface into a new RGB value according to a mapping rule corresponding to the display mode; and calculating the first exposure time based on the new RGB value of each pixel, the brightness bar setting order, the DBV order of the display driver IC, and the ELVSS voltage.

In a possible implementation, the calculating the first exposure time based on the new RGB value of each pixel, the brightness bar setting order, the DBV order of the display driver IC, and the ELVSS voltage includes: calculating the first exposure time by using the following formula:

$$t = \frac{k_r}{N}\sum_{i=1}^{N} LR_i + \frac{k_g}{N}\sum_{i=1}^{N} LG_i + \frac{k_b}{N}\sum_{i=1}^{N} LB_i + k_1 L_{ev} + k_2 L_{dbv} + k_3 V_{elvss} + b$$

where t is the first exposure time; $k_1$, $k_2$, $k_3$, $k_r$, $k_g$, and $k_b$ all are preset coefficients; $LR_i$ represents a new R value of an $i^{th}$ pixel, $LG_i$ represents a new G value of the $i^{th}$ pixel, $LB_i$ represents a new B value of the $i^{th}$ pixel; N is a total number of pixels in the first interface; $L_{ev}$ represents the brightness bar setting order; $L_{dbv}$ represents the DBV order of the display driver IC; $V_{elvss}$ represents the ELVSS voltage; and b is a preset constant.

In a possible implementation, the correcting the first exposure time based on a preset correction parameter to obtain second exposure time includes: correcting the first exposure time according to the following formula to obtain the second exposure time:

$$\frac{t_1 - t_{min\_cal}}{t_{max\_cal} - t_{min\_cal}} = \frac{t - t_{min\_std}}{t_{max\_std} - t_{min\_std}}$$

where t is the first exposure time; $t_1$ is the second exposure time; $t_{min\_std}$ is the exposure time required for the standard product to collect a fingerprint when the fingerprint light spot is brightest, $t_{max\_std}$ is the exposure time required for the standard product to collect a fingerprint when the fingerprint light spot is darkest, $t_{min\_cal}$ is the exposure time required for the electronic device to collect a fingerprint when the fingerprint light spot is brightest, and $t_{max\_cal}$ is the exposure time required for the electronic device to collect a fingerprint when the fingerprint light spot is darkest.

In a possible implementation, the adjusting the second exposure time includes: shortening the second exposure time when it is determined based on the exposure degree that the first fingerprint image is overexposed; or prolonging the second exposure time when it is determined based on the exposure degree that the first fingerprint image is underexposed.

According to a second aspect, an embodiment of this application provides an electronic device, including one or more processors, a memory, and one or more computer programs. The one or more computer programs are stored in the memory, and the one or more computer programs include instructions which, when executed by the device, enable the device to perform the method according to any implementation of the first aspect.

According to a third aspect, an embodiment of this application provides a computer-readable storage medium. The computer-readable storage medium stores instructions. When the instructions are run on a computer, the computer is enabled to perform the method according to any implementation of the first aspect.

In a fourth aspect, this application provides a computer program. When the computer program is performed by a computer, the method according to the first aspect is performed.

In a possible design, all or a part of the program in the fourth aspect may be stored in a storage medium packaged with a processor, may be stored in a memory not packaged with the processor.

BRIEF DESCRIPTION OF DRAWINGS

FIG. 8A and FIG. 8B are a time sequence diagram of interaction between modules in an electronic device according to an embodiment of this application.

DESCRIPTION OF EMBODIMENTS

Figure 1:
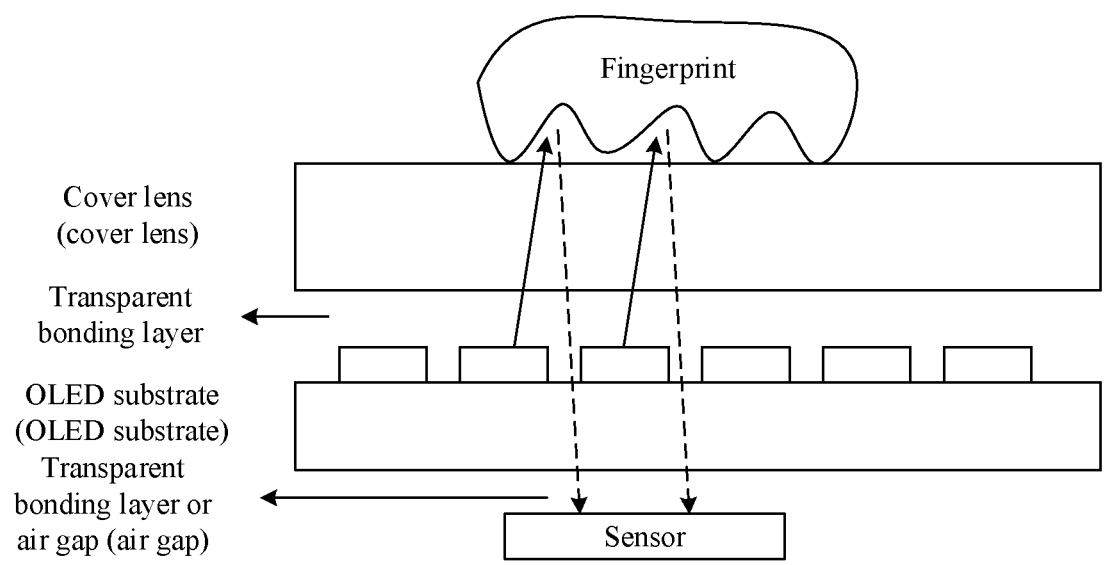
FIG. 1 is a schematic diagram of a principle of implementing optical fingerprint-on-display collection on an OLED screen.

Terms used in the description of embodiments of this application are only used to explain specific embodiments of this application, and are not intended to limit this application.

At present, electronic devices need to be authenticated in many scenarios, such as screen unlocking, cash payment, and so on. Identity authentication methods include a fingerprint-based identity authentication method, which is referred to as a fingerprint authentication method below for convenience of description.

The fingerprint authentication method usually includes two stages: registration and authentication. In the registration stage, the electronic device collects a fingerprint image of a user and stores the fingerprint image as a fingerprint template. In the authentication stage, the electronic device collects a fingerprint image of a user to be authenticated, and matches the collected fingerprint image with a pre-stored fingerprint template to obtain a fingerprint feature matching degree. If it is determined that the fingerprint feature matching degree reaches a preset threshold, the fingerprint authentication succeeds; otherwise, the fingerprint authentication fails.

In an example, with increasing use of full-screen electronic devices, in the fingerprint authentication method, a fingerprint image of a user can be collected through an optical fingerprint-on-display collection method.

The optical fingerprint-on-display collection method includes two collection methods: collection with fixed exposure time and collection with automatic adjustment of exposure time.

In the collection method with the fixed exposure time, the exposure time is preset in the electronic device, and exposure is performed based on the exposure time in each time of fingerprint collection. In the method with the fixed exposure time, better fingerprint images can be obtained in some conventional scenarios. However, in a light source fluctuation scenario, a strong light scenario, and another scenario, the electronic device cannot obtain a correctly exposed fingerprint image during fingerprint image collection with fixed exposure time. As a result, fingerprint authentication fails, which affects fingerprint authentication efficiency and affects user experience.

In the method with automatic adjustment of exposure time, the electronic device collects a fingerprint image based on the preset exposure time. When exposure of a collected fingerprint image does not meet a requirement (that is, the fingerprint image is not exposed correctly), the exposure time is adjusted, and a fingerprint image is collected again based on adjusted exposure time. The cycle repeats until a correctly exposed fingerprint image is collected. The method with automatic adjustment of exposure time has an advantage that a fingerprint image with accurate exposure can still be obtained when a light source fluctuates or an external environment changes. A disadvantage thereof is as follows: An exposure time adjustment speed depends on information about a first fingerprint image, and the exposure time adjustment speed is slow. In an extreme scenario, multiple frames of fingerprint images need to be collected to obtain a correctly exposed fingerprint image. This affects a to collect collection speed, thereby affecting a speed and efficiency of fingerprint authentication and user experience.

Reasons for the problems in the foregoing two methods for determining the exposure time are analyzed and explained below.

At present, a display screen used for the electronic device is usually an organic light-emitting diode (Organic Light-Emitting Diode, OLED) screen, and there is a specific spacing between pixels of the OLED screen, which can ensure light to pass through. The optical fingerprint-on-display collection method takes advantage of this feature of the OLED screen. FIG. 1 is a schematic diagram of a principle of implementing optical fingerprint-on-display collection on an OLED screen. The OLED screen includes a cover lens (cover lens), a transparent bonding layer, an OLED substrate (OLED substrate), a transparent bonding layer (or an air gap), and a sensor. A pixel unit on the OLED substrate emits light (as shown by solid lines in FIG. 1), which illuminates a finger area close to the screen through the cover lens. The light is reflected by the finger area (as shown by a fingerprint in FIG. 1) to obtain reflected light (as shown by dotted lines in FIG. 1), and the reflected light returns to the sensor under the OLED substrate through the gap between the cover lens and the pixel unit. In this way, the electronic device can generate a fingerprint image based on the light received by the sensor.

Time from a moment at which the sensor receives light to a moment at which the sensor stops receiving light is referred to as fingerprint collection exposure time.

Figure 2A:
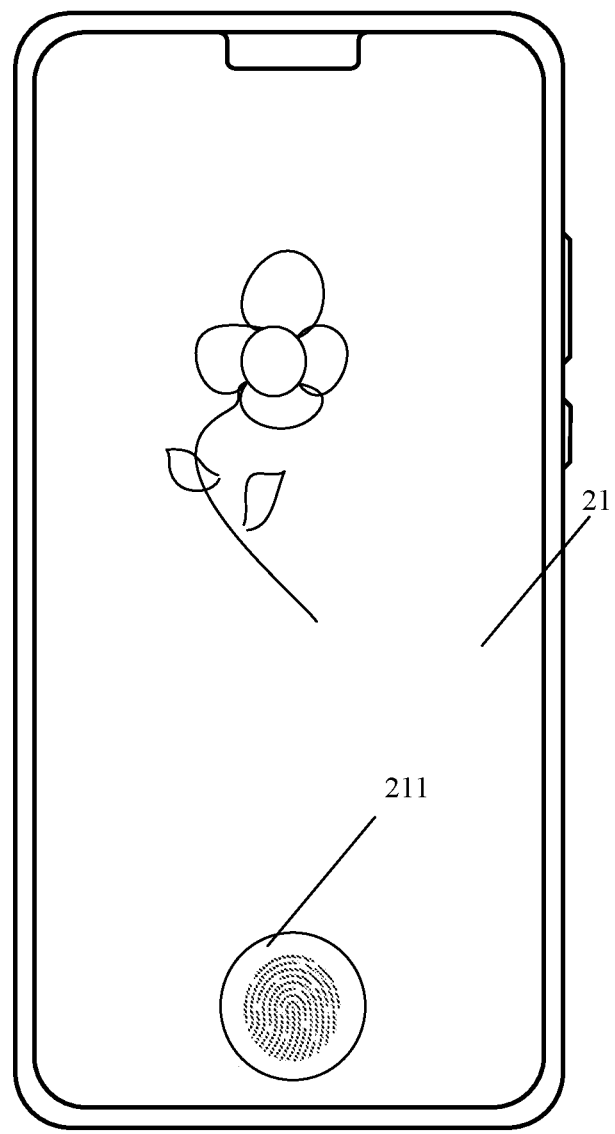
FIG. 2A is a schematic diagram of a screen unlocking scenario to which a fingerprint-on-display collection method according to an embodiment of this application is applicable.

Based on the foregoing implementation principle, during optical fingerprint-on-display collection, to achieve a good fingerprint collection effect without affecting image display on another area of the screen, the screen of the electronic device is usually provided with a designated fingerprint collection area, as shown in a part 211 of a mobile phone unlocking interface 21 in FIG. 2A. During fingerprint collection, a pixel unit in the fingerprint collection area emits light based on preset brightness to form a light spot (referred to as a fingerprint light spot below) as a light source for fingerprint-on-display collection. Fluctuation of the light source directly affects an exposure effect of a fingerprint. In the OLED screen, brightness of the fingerprint light spot is affected by a screen brightness order and a display image in a screen area outside the fingerprint light spot. That is, although brightness of the pixel unit in the fingerprint collection area is set, pixel brightness is affected by the screen brightness order and the display image in the screen area outside the fingerprint light spot. As a result, actual brightness of the fingerprint light spot cannot reach the preset brightness, and brightness of the fingerprint light spot fluctuates by 20% to 30% in an extreme scenario. This leads to inaccurate or slow exposure of a fingerprint image, affects a fingerprint authentication speed, and affects user experience.

In view of this, this application provides a fingerprint-on-display collection method and an electronic device, to improve a speed at which the electronic device obtains a correctly exposed fingerprint image, improve fingerprint authentication efficiency, and improve user experience.

It should be noted that the fingerprint-on-display collection method provided in embodiments of this application may be applied to a screen whose screen brightness changes greatly with an average picture level (Average Picture Level, APL), that is, a screen in which the brightness of the fingerprint light spot is affected by the screen brightness order, the display picture in the screen area outside the fingerprint light spot, and the like, such as the OLED screen mentioned above.

That the electronic device is a mobile phone is used as an example to describe a scenario to which the fingerprint-on-display collection method in embodiments of this application is applicable.

FIG. 2A is a schematic diagram of a screen unlocking scenario to which a fingerprint-on-display collection method according to an embodiment of this application is applicable. A user triggers a screen unlocking process by shaking the mobile phone, pressing a designated key, pressing a designated position on a screen, and so on. The mobile phone displays a screen unlocking interface, for example, as shown in the interface 21 in FIG. 2A. The interface 21 includes a lock screen wallpaper and a fingerprint collection area 211. A finger of the user touches the fingerprint collection area 211, and the mobile phone starts collecting a fingerprint of the user and a subsequent fingerprint authentication process.

Figure 2B:
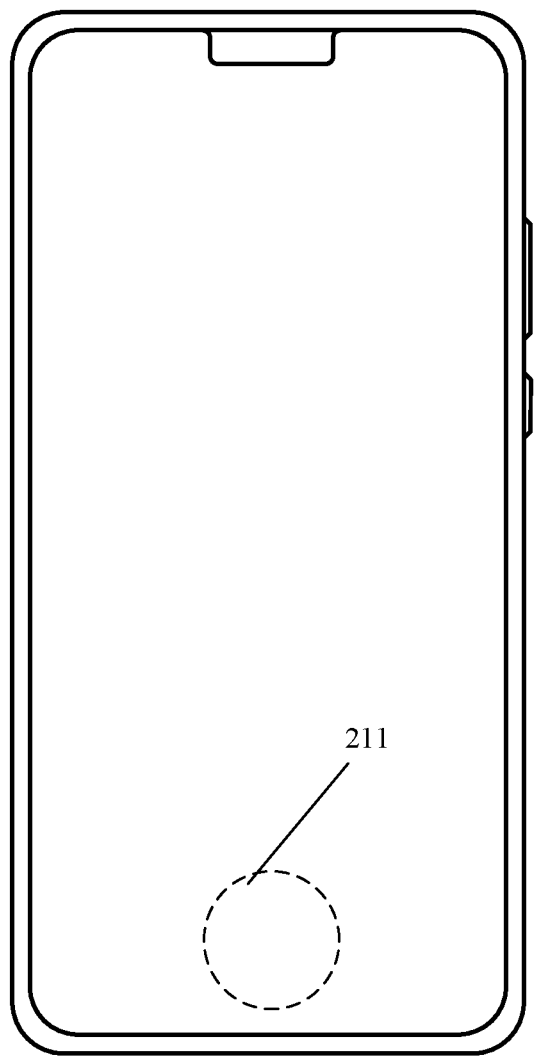
FIG. 2B is a schematic diagram of a screen unlocking scenario to which a fingerprint-on-display collection method according to an embodiment of this application is applicable.

FIG. 2B is another schematic diagram of a screen unlocking scenario to which a fingerprint-on-display collection method according to an embodiment of this application is applicable. In FIG. 2B, the user may press the fingerprint collection area 211 of the screen when the screen is black, that is, pixels in the screen are turned off, and the mobile phone starts collecting a fingerprint of the user and a subsequent fingerprint authentication process.

It should be noted that the scenario to which the fingerprint-on-display collection method in embodiments of this application is applicable may further include: invoking fingerprint authentication when an application is used for cash payment, setting a fingerprint template for fingerprint authentication in the "Settings" application of the mobile phone, and so on. Details are not listed herein.

Figure 3:
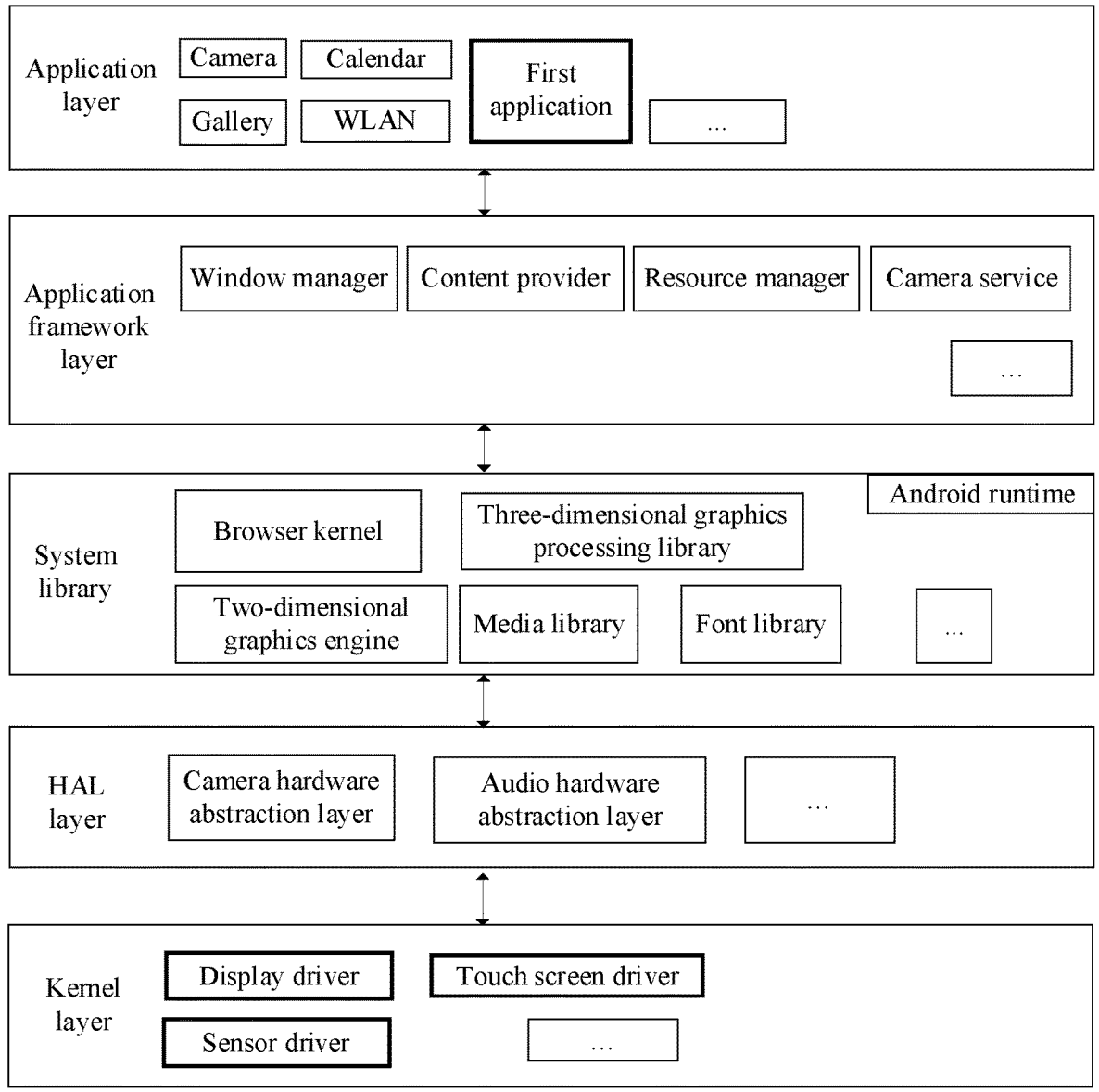
FIG. 3 is a schematic diagram of a software structure of an embodiment of an electronic device according to this application.

FIG. 3 is a block diagram of a software structure of a first electronic device according to an embodiment of this application. The software is divided into several layers in a hierarchical architecture, and each layer has a clear role and responsibility. Layers communicate with each other through a software interface. This embodiment of this application takes the Android system as an example to explain the software structure of the first electronic device of the Android system. In some embodiments, the Android system is divided into five layers, namely, an application layer, an application framework layer (also referred to as a system framework layer), a system library and Android runtime layer, a hardware abstraction layer (hardware abstraction layer, HAL), and a kernel layer from top to bottom.

The application layer can include several applications (referred to as application programs below), such as camera, gallery, calendar, WLAN, and the like. The application layer of the first electronic device in this embodiment of this application includes a first application. The first application is an application that invokes a fingerprint authentication function in this embodiment of this application. For example, the first application may be an application for lock screen management, a banking application, or a "settings" application.

The application framework layer provides an application programming interface (Application Programming Interface, API) and a programming framework for an application at the application layer, including various components and services to support Android development of developers. The application framework layer further includes some pre-defined functions. For example, the application framework layer may include a window manager, a content provider, a resource manager, a camera service, and the like.

The system library and Android runtime layer includes a system library and an Android runtime (Android Runtime). The system library may include multiple functional modules, for example, a surface manager, a two-dimensional graphics engine, a three-dimensional graphics processing library (for example, OpenGL ES), a media library, and a font library. A browser kernel is responsible for explaining a syntax of a web page (for example, an application such as HTML or JavaScript under a standard generalized markup language) and rendering (displaying) the web page. The two-dimensional graphics engine is configured to implement two-dimensional graphics drawing, image rendering, composition, and layer processing. The three-dimensional graphics processing library is configured to implement three-dimensional graphics drawing, image rendering, composition, and layer processing. The media library is configured to input different streaming media. The font library is configured to input different fonts. The Android runtime is responsible for scheduling and management of the Android system, specifically including a core library and a virtual machine. The core library includes two parts: one part is a function that a java language needs to invoke, and the other part is an Android core library. The virtual machine is for running an Android application developed in the java language.

The HAL layer is an interface layer between an operating system kernel and a hardware circuit. The HAL layer includes but is not limited to an audio hardware abstraction layer (Audio HAL) and a camera hardware abstraction layer (Camera HAL). The audio HAL is for processing an audio stream, such as noise reduction and directional enhancement on the audio stream. The camera HAL is for processing an image stream.

The kernel layer is a layer between hardware and software. The kernel layer may include a touch screen driver, a display driver, a sensor driver, and the like.

In the following embodiments, the fingerprint-on-display collection method in embodiments of this application is described in detail in combination with the software structure of the foregoing electronic device.

Figure 4:
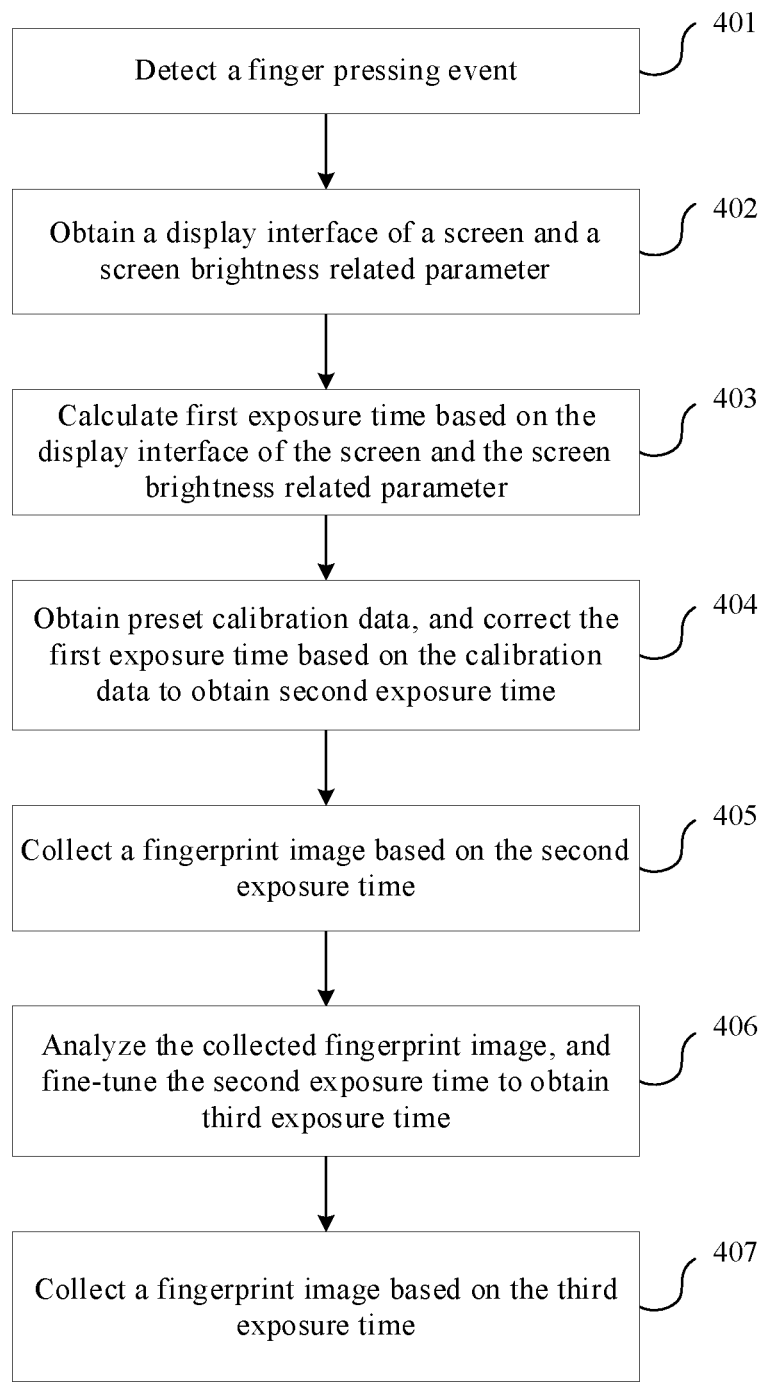
FIG. 4 is a schematic flowchart of an embodiment of a fingerprint-on-display collection method according to this application.

FIG. 4 is a flowchart of an embodiment of a fingerprint-on-display collection method according to this application. As shown in FIG. 4, the method may include the following steps.

Step 401: Detect a finger pressing event.

A screen of an electronic device may include a touch screen and a display screen. The touch screen detects whether a finger pressing event occurs in the fingerprint collection area shown in, for example, FIG. 2A and FIG. 2B, and if the finger pressing event is detected, generates an interrupt event and sends the event to a touch screen driver. Accordingly, the electronic device detects the finger pressing event. The detection of the finger pressing event in the fingerprint collection area by the touch screen can be triggered periodically by the electronic device (such as the touch screen driver) when the electronic device is locked, or triggered by an application of the electronic device.

Step 402: Obtain a display interface of the screen and a screen brightness related parameter.

The screen brightness related parameter is a parameter that can affect display brightness of the screen in the electronic device. The display brightness herein is the brightness of the screen that is finally displayed by the screen to the user and can be felt by the user. The display brightness mentioned in this embodiment of this application may be represented by a RGB value of each pixel on the screen. Each pixel on the screen includes three sub-pixels: R, G and B. Brightness intervals of the three sub-pixels all are [0, 255]. Different brightness of R, G and B can not only form different colors, but also represent display brightness of a pixel. A higher value of RGB indicates higher display brightness of a pixel to which the RGB belongs. For example, when RGB of a pixel is (0, 0, 0), the pixel is black with lowest display brightness; and when RGB of a pixel is (255, 255, 255), the pixel is white with highest display brightness. Settings of brightness, a color temperature, and a color in the electronic device can ultimately be attributed to adjusting RGB values of pixels on the screen.

The screen brightness related parameter may include but is not limited to the following parameters: a brightness bar setting order, a display brightness value (display brightness value, DBV) order of a display driver integrated circuit (Integrated Circuit, IC), an electroluminescence source supply (electroluminescence source supply, ELVSS) voltage, and a display mode.

The brightness bar setting order is the screen brightness order described above, and indicates brightness set for the screen. In the electronic device, the screen brightness order is usually displayed to the user in a form of a brightness bar for the user to adjust the screen brightness order. Therefore, the screen brightness order may also be referred to as the brightness bar setting order. Different orders of the brightness bar correspond to different brightness of the screen. Usually, a higher order indicates higher screen brightness. The electronic device can adjust the screen brightness based on the brightness bar through DC adjustment or PWM adjustment.

The DBV order of the display driver IC is for representing the brightness of the screen, and adjusting the DBV order means adjusting the brightness of the screen.

The display mode described in this embodiment of this application is a general name of setting modes for adjusting parameters such as a color, a color temperature and/or a contrast of a screen display interface. Different display modes can correspond to different information such as the color, the color temperature, and/or the contrast, so that adjusting the display mode can correspondingly adjusting the parameters such as the color, the color temperature, and/or the contrast of the screen display interface. For example, the display mode may include but not limited to: an e-book mode, an eye protection mode, a barrier-free mode, and the like. The display mode may further include other settings for adjusting the color, color temperature and/or the contrast of the screen display interface in the electronic device, such as a color temperature setting function and a color adjustment function.

The display interface of the screen may be an interface displayed on the screen during fingerprint collection. For example, in FIG. 2A, the mobile phone displays a lock screen interface, where a lock screen wallpaper is a static image, and the display interface of the screen may be a screenshot of the lock screen interface in the unlocking scenario shown in FIG. 2A. If the lock screen wallpaper is animated, the display interface of the screen can be several screenshots of the lock screen interface in the unlocking scenario shown in FIG. 2A, and a specific number of screenshots is not limited in this embodiment of this application. For example, in FIG. 2B, when a fingerprint is collected, the screen is locked and the screen is closed. At this time, the display interface of the screen may be considered as an image with black pixels.

It should be noted that the display interface of the screen in this step may refer to image data that an application sends to a display driver and needs to be displayed on the display screen. The image data is image data that is before the display driver performs processing based on the display mode. Alternatively, the display interface of the screen may be an interface actually displayed on the display screen after the display driver performs processing based on the display mode.

Step 403: Calculate first exposure time based on the display interface of the screen and the screen brightness related parameter.

This step is implemented by using an example in which the screen brightness related parameter includes the brightness bar setting order, the DBV order of the display driver IC, the ELVSS voltage, and the display mode.

In a possible implementation, this step may include:

Step S1: For the display interface of the screen, the RGB value of each pixel in the display interface is mapped into a new RGB value according to a mapping rule corresponding to the display mode.

It should be noted that the display interface of the screen in this step refers to image data that an application sends to a display driver and needs to be displayed on the display screen. The image data is image data that is before the display driver performs processing based on the display mode. If the display interface of the screen is an interface actually displayed on the display screen after the display driver performs processing based on the display mode, this step can be omitted.

Step S2: Calculate the first exposure time according to the following formula and based on the new RGB value of each pixel in the display interface, the brightness bar setting order, the DBV order of the display driver IC, and the ELVSS voltage:

$$t = \frac{k_r}{N}\sum_{i=1}^{N} LR_i + \frac{k_g}{N}\sum_{i=1}^{N} LG_i + \frac{k_b}{N}\sum_{i=1}^{N} LB_i + k_1 L_{ev} + k_2 L_{dbv} + k_3 V_{elvss} + b$$

where t is the first exposure time; $k_1$, $k_2$, $k_3$, $k_r$, $k_g$, and $k_b$ all are preset coefficients; $LR_i$ represents an R value of an $i^{th}$ pixel, $LG_i$ represents a G value of the $i^{th}$ pixel, $LB_i$ represents a B value of the $i^{th}$ pixel; N is a total number of pixels; $L_{ev}$ represents the brightness bar setting order; $L_{dbv}$ represents the DBV order of the display driver IC; $V_{elvss}$ represents the ELVSS voltage; and b is a preset constant.

If the display interface is multiple screenshots, N in the foregoing formula may be a total number of pixels in the multiple screenshots.

Methods for determining the preset coefficients $k_1$, $k_2$, $k_3$, $k_r$, $k_g$, and $k_b$ and the preset constant b in the foregoing formula are described below.

In an experimental stage, a standard product may be used for the following measurement and calculation: Exposure time t of a correctly exposed fingerprint image obtained by the standard product is measured under different display interfaces and screen brightness related parameters (the brightness bar setting order $L_{ev}$, the DBV order $L_{dbv}$ of the display driver IC, the ELVSS voltage $V_{elvss}$, and the display mode). At this time, the exposure time t, and the display interface and the screen brightness related parameters corresponding to the exposure time t are substituted into the foregoing steps S1 and S2. The preset coefficients $k_1$, $k_2$, $k_3$, $k_r$, $k_g$, and $k_b$, and the preset constant b in the foregoing formula can be obtained through data fitting when measurement data is sufficient.

The standard product in this embodiment of this application may be a prototype that is selected from prototypes mass-produced in a production line and that can represent optimal exposure time of most products. The prototype is used as the standard product, and an unknown preset coefficient in a model can be calculated based on this standard product by using the foregoing method.

It should be noted that, usually, the DBV order of the display driver IC and/or the ELVSS voltage are adjusted in a product design stage. A fixed value is set after the product is released, or a fixed value is set in a specific scenario. Certainly, the two parameters may alternatively be dynamically adjusted during use by the user. When the DBV order of the display driver IC and/or the ELVSS voltage are fixed values, influence of the DBV order of the display driver IC and/or the ELVSS voltage may not be considered in the foregoing formula. When the two parameters need to be dynamically adjusted during use by the user, the two parameters need to be calculated as variables in the foregoing formula.

It should be noted that the foregoing formula model for calculating the first exposure time t is only an example. In actual application, another formula model that accurately describes a relationship between the exposure time and the display interface of the screen and the screen brightness related parameter can be set in the electronic device for calculating the first exposure time t. This is not limited by this embodiment of this application.

Step 404: Obtain preset calibration data, and correct the first exposure time based on the calibration data to obtain second exposure time.

In the formula described in step 403, the preset coefficients $k_1$, $k_2$, $k_3$, $k_r$, $k_g$, and $k_b$, and the preset constant b are all obtained by fitting the measured data of the standard product, and therefore, are suitable for a system environment of the standard product. Therefore, the first exposure time of the standard product can be calculated more accurately based on the foregoing formula. However, due to fluctuation of mass production, optimal exposure parameters of different electronic devices differ. In addition, it is not feasible to measure and calculate the foregoing preset coefficients for each mass production prototype. Therefore, the preset coefficients and the preset constant of the standard product mentioned above may be set in another electronic device (for example, a mobile phone). Due to differences between the electronic devices, when an electronic device calculates first exposure time using the preset coefficients and the preset constant mentioned above, the first exposure time may differ with exposure time actually required by another electronic device. Based on the foregoing reasons, this step can be added when the foregoing formula is set for other electronic devices (such as mass-produced mobile phones and other equipment) than the standard product. The electronic device corrects the first exposure time, so that the corrected second exposure time can better meet an exposure condition when the electronic device collects fingerprints.

Implementation of this step is illustrated below.

A correction parameter and a correction function based on the correction parameter $t_1=f(t, t_{max\_cal}, t_{min\_cal}, t_{max\_std}, t_{min\_std})$ are preset in the electronic device. The correction parameter may include exposure time $t_{min\_std}$ required for the standard product to collect a fingerprint when a fingerprint light spot is brightest, exposure time $t_{max\_std}$ required for the standard product to collect a fingerprint when a fingerprint light spot is darkest, exposure time $t_{min\_cal}$ of the electronic device when a fingerprint light spot is brightest, and exposure time $t_{max\_cal}$ of the electronic device when a fingerprint light spot is darkest. $t_1$ in the correction function is the second exposure time, and t is the first exposure time.

Figure 5A:
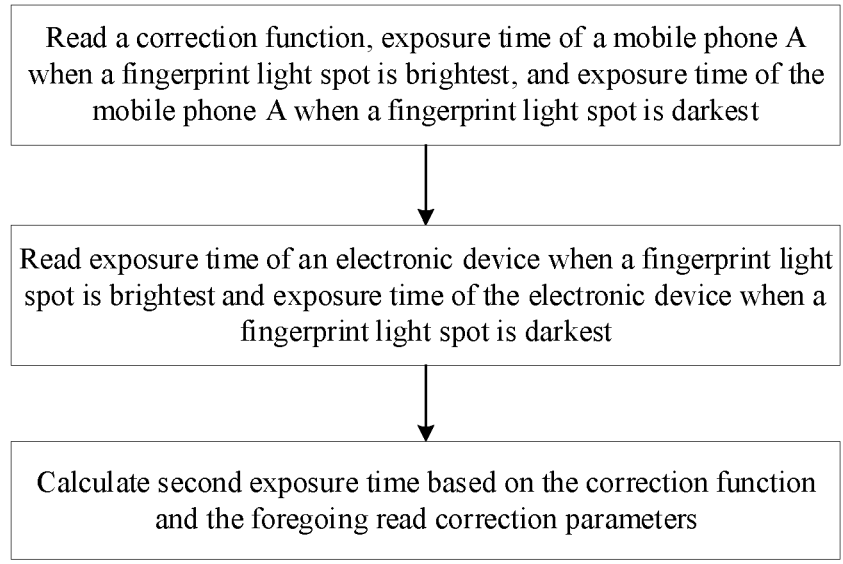
FIG. 5A is a schematic flowchart of an implementation of a correction step in a fingerprint-on-display collection method according to this application.

As shown in FIG. 5A, this step may include:

reading the correction function, the exposure time trainstd required for the standard product when the fingerprint light spot is brightest, and the exposure time $t_{max\_std}$ required for the standard product when the fingerprint light spot is darkest;

reading the exposure time $t_{min\_cal}$ of the electronic device when the fingerprint light spot is brightest, and the exposure time $t_{max\_cal}$ of the electronic device when the fingerprint light spot is darkest; and calculating the second exposure time $t_1$ based on the correction function $t_1=f(t, t_{max\_cal}, t_{min\_cal}, t_{max\_std}, t_{min\_std})$ and the foregoing read correction parameters.

Optionally, the correction function $t_1=f(t, t_{max\_cal}, t_{min\_cal}, t_{max\_std}, t_{min\_std})$ may be expressed as the following formula:

$$\frac{t_1 - t_{min\_cal}}{t_{max\_cal} - t_{min\_cal}} = \frac{t - t_{min\_std}}{t_{max\_std} - t_{min\_std}}$$

Optionally, the exposure time $t_{min\_std}$ of the standard product when the fingerprint light spot is brightest and the exposure time $t_{max\_std}$ of the standard product when the fingerprint light spot is darkest may be tested in advance and stored in the electronic device. The exposure time $t_{min\_cal}$ of the electronic device when the fingerprint light spot is brightest and the exposure time $t_{max\_cal}$ of the electronic device when the fingerprint light spot is darkest may be obtained by calibration test before the electronic device is delivered from the factory and stored in the electronic device.

Figure 5B:
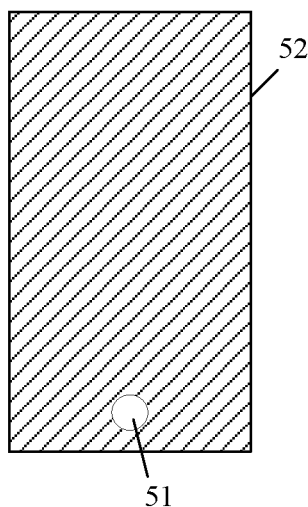
FIG. 5B is a schematic diagram of a screen interface and a fingerprint collection area according to this application.

That the fingerprint light spot is brightest usually means that the screen interface is pure black except for the fingerprint light spot and the screen brightness bar is at a lowest order (that is, the screen brightness is darkest), for example, a part 52 indicated by oblique lines in FIG. 5B is pure black and the screen brightness bar is currently at the highest order. In this case, the corresponding exposure time is usually a lower exposure time limit. That the fingerprint light spot is darkest usually means that the screen interface is pure white except for the fingerprint light spot and the screen brightness bar is at a highest order (that is, the screen brightness is brightest), for example, a part 52 indicated by oblique lines in FIG. 5B is pure white and the screen brightness bar is currently at the highest order. In this case, the corresponding exposure time is usually an upper limit of exposure time.

Step 405: Collect a fingerprint image based on the second exposure time.

It should be noted that, according to the fingerprint-on-display collection method in this embodiment of this application, a correctly exposed fingerprint image can usually be obtained through the foregoing processing under normal circumstances. However, if the collected fingerprint image still does not meet an exposure requirement after step 405, the fingerprint-on-display collection method in this embodiment of this application may further include steps 406 to 407 after step 405.

Step 406: Analyze the collected fingerprint image, and fine-tune the second exposure time to obtain third exposure time when the fingerprint image is not exposed correctly.

In this step, exposure of the collected fingerprint image can be detected. If the exposure is less than a preset first threshold, it indicates that the collected fingerprint image is underexposed, and the second exposure time can be prolonged to obtain the third exposure time. If the exposure is greater than a second threshold, the collected fingerprint image is overexposed, and the second exposure time can be shortened. Optionally, when prolonging or shortening the second exposure time, the second exposure time can be prolonged or shortened according to a preset step size, and a specific value of the step size is not limited in this embodiment of this application.

If the fingerprint image is correctly exposed, the fingerprint collection is finished, and subsequent steps such as storing the fingerprint image as a fingerprint template or comparing the fingerprint image with a preset fingerprint template for identity authentication can be performed.

Step 407: Collect a fingerprint image based on the third exposure time.

It should be noted that steps 406 to 407 may be cyclic steps. If the fingerprint image collected based on the third exposure time still does not meet the exposure requirement, step 406 may be returned to fine-tune the third exposure time, and then collect a fingerprint image based on fine-tuned exposure time, until a fingerprint image meets the exposure requirement.

Optionally, to control fingerprint collection time and prevent excessive cyclic executions of steps 406 and 407, a maximum number of cycles of steps 406 and 407 can be preset in the electronic device, or a maximum number of exposure times for fingerprint collection can be preset in the electronic device. In this case, even if a fingerprint image obtained from the last exposure does not meet the exposure requirement, subsequent steps such as matching the fingerprint image with the fingerprint template are still be performed to complete a fingerprint authentication. It should be understood that a specific value of the maximum number of cycles or the maximum number of exposure times is not limited in this embodiment of this application. For example, the maximum number of cycles may be two, three, or four, and the maximum number of exposure times may be three, four, or five.

In the method shown in FIG. 4, the first exposure time is calculated based on the display interface and the screen brightness related parameter, the first exposure time is corrected to obtain the second exposure time, and fingerprint collection is performed based on the second exposure time. In this way, the second exposure time used for the first time of fingerprint collection by the electronic device reaches or approaches the exposure time corresponding to the correct exposure, so that the electronic device can directly obtain the correctly exposed fingerprint image. In an extreme case, usually, the exposure time corresponding to the correct exposure can be obtained through a small number of exposure time adjustments, to obtain the correctly exposed fingerprint image, thereby improving a speed at which the electronic device obtains the correctly exposed fingerprint image and improving user experience.

Figure 6:
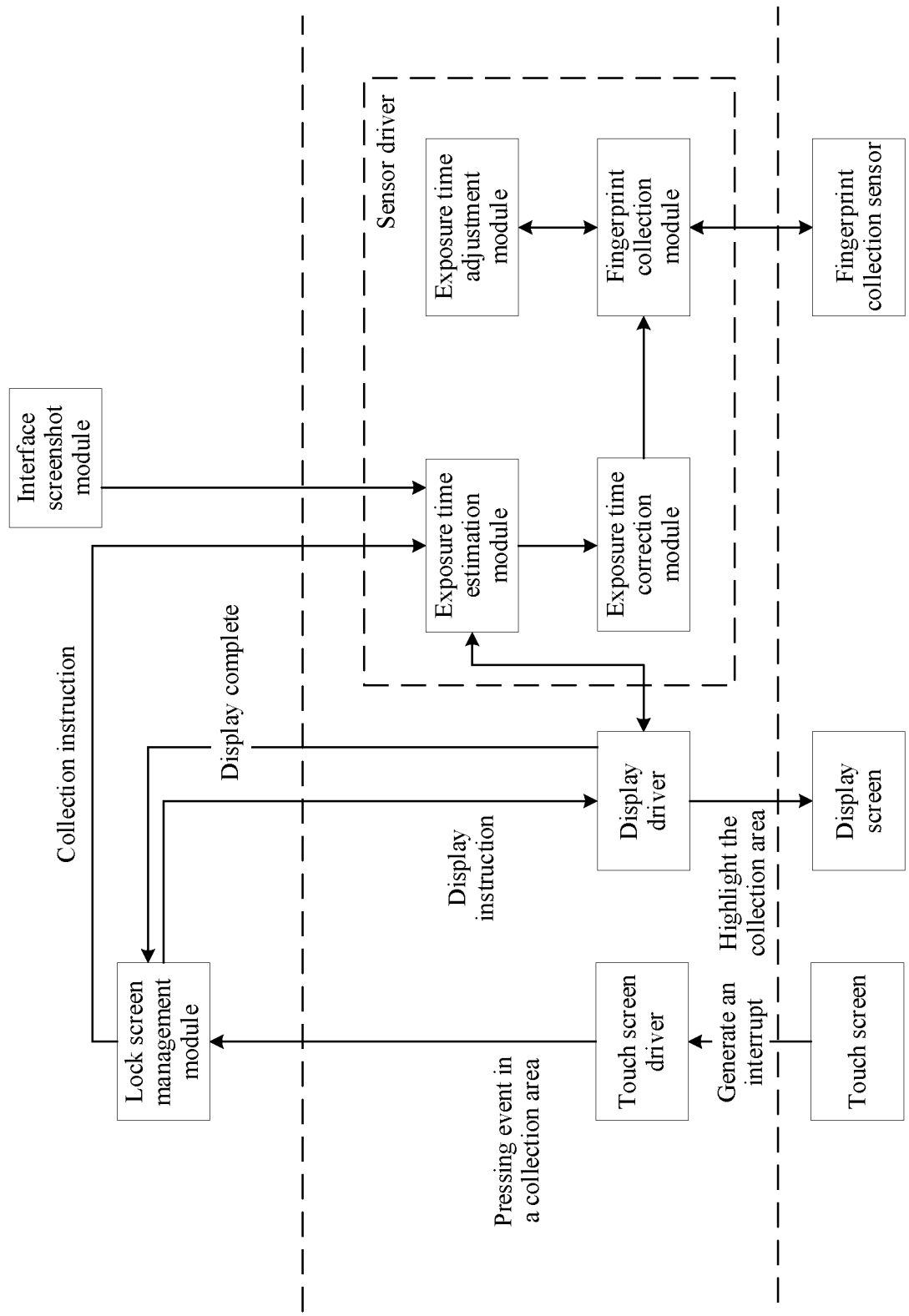
FIG. 6 is a schematic flowchart of interaction between modules in an electronic device according to an embodiment of this application.
Figure 7:
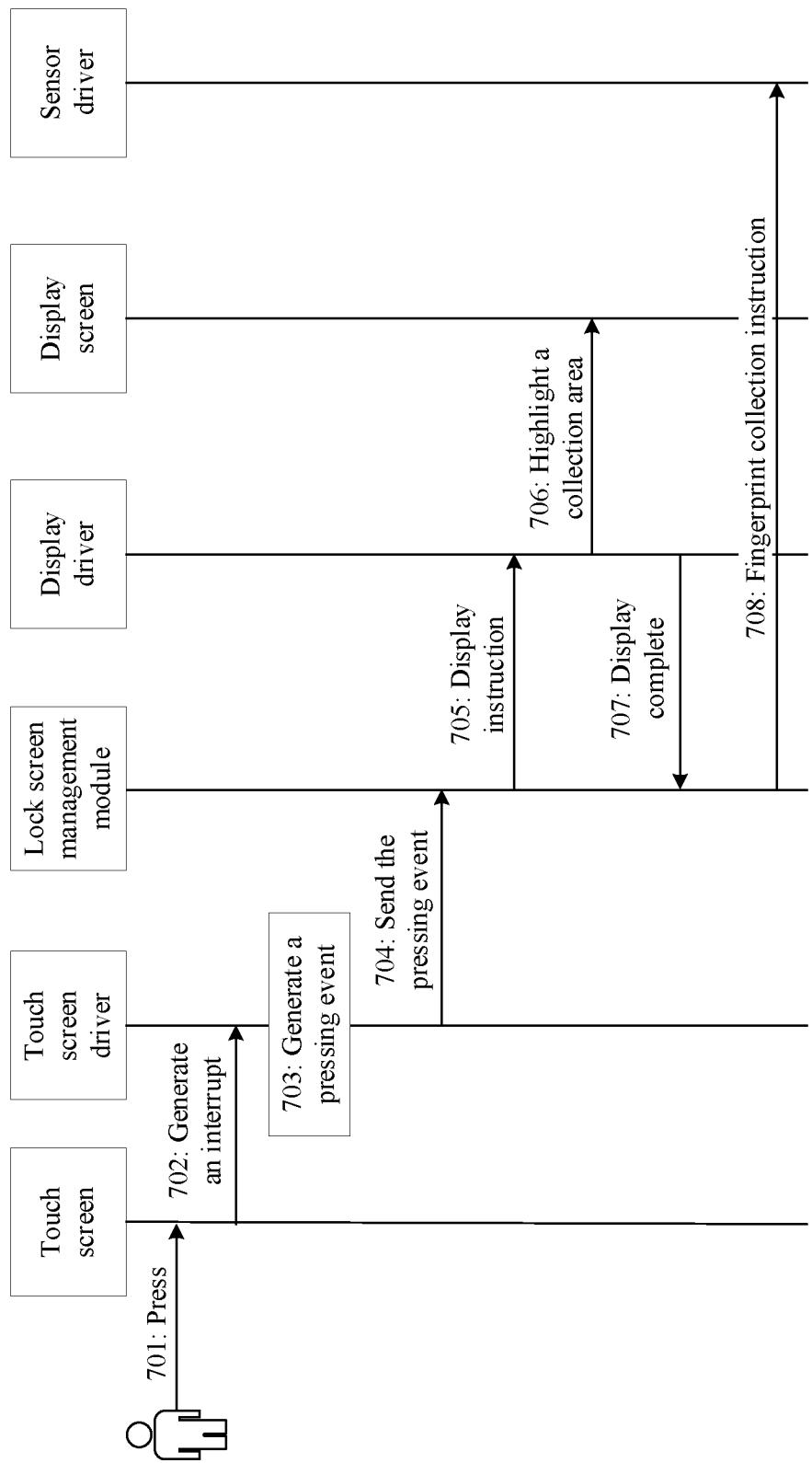
FIG. 7 is a time sequence diagram of interaction between modules in an electronic device according to an embodiment of this application.
Figure 8B:
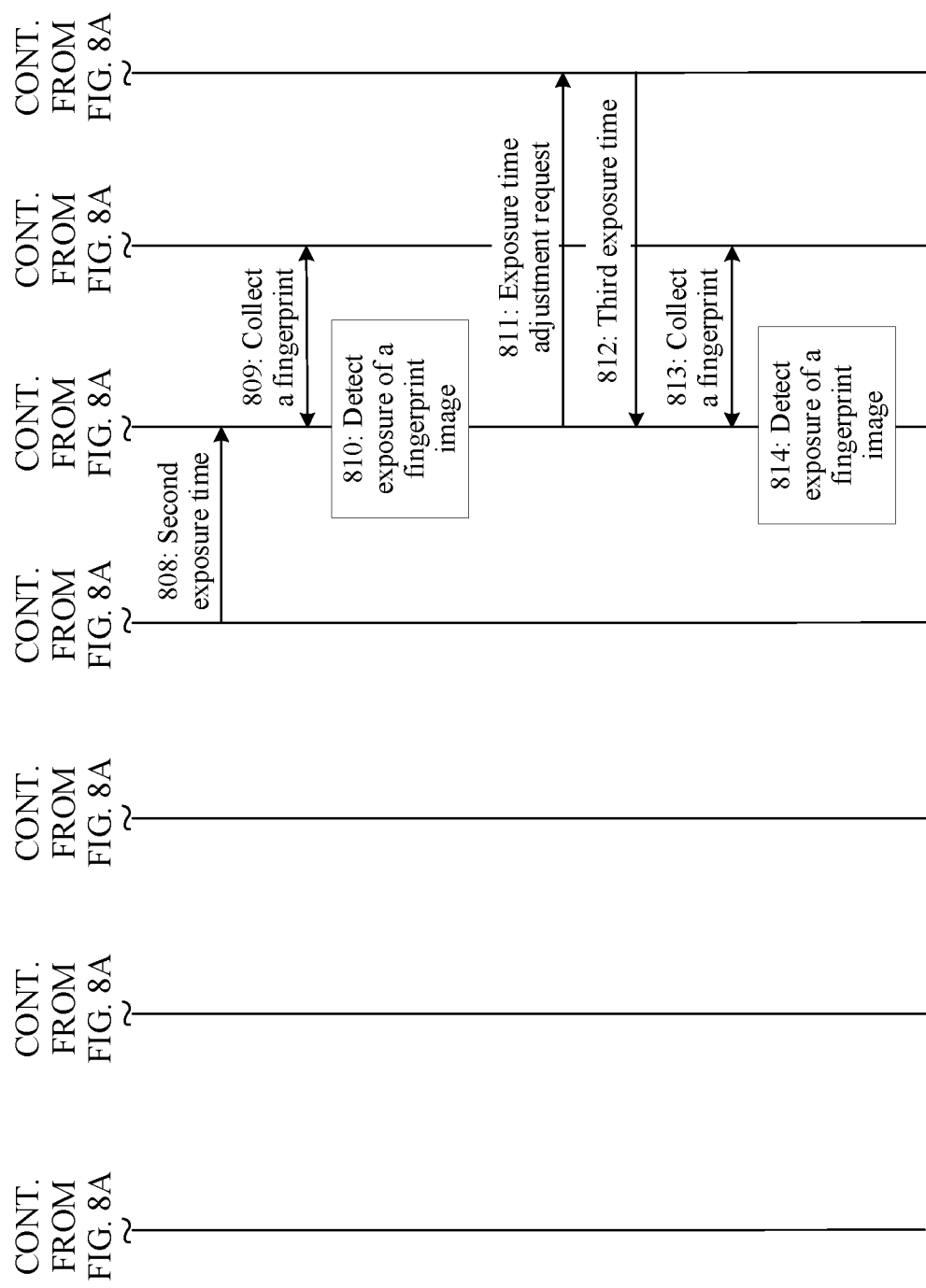

The following describes in detail the fingerprint-on-display collection method shown in FIG. 4 with reference to a schematic flowchart of interaction of modules in an electronic device shown in FIG. 6 and time sequence diagrams of interaction of modules in an electronic device shown in FIG. 7 and FIG. 8A and FIG. 8B.

As shown in FIG. 6, a sensor driver may include an exposure time estimation module, an exposure time correction module, an exposure time adjustment module, and a fingerprint collection module.

In FIG. 6, the sensor driver, a display driver, and a touch screen driver may be located in a kernel layer. A lock screen management module may be located in a framework layer or an application layer. Optionally, the lock screen management module may be a module in the first application described above in embodiments of this application. An interface screenshot module may be located in the framework layer, the application layer, or a driver layer. Optionally, the interface screenshot module may be a module in the first application described above in embodiments of this application or a module in the display driver.

It should be noted that the sensor driver may further include: a fingerprint matching module, configured to: store a collected fingerprint image as a fingerprint template; or compare a collected fingerprint image with a fingerprint template to obtain an identity authentication result.

FIG. 7 is a possible schematic diagram of a procedure in which an electronic device triggering fingerprint collection. As shown in FIG. 7, the procedure includes:

Step 701: Detect that a user presses a fingerprint collection area.

A touch screen may detect whether the user presses the touch screen and a location at which the user presses the touch screen. In a fingerprint collection scenario, the touch screen may be divided into the fingerprint collection area and another area. The touch screen detects whether the user presses the fingerprint collection area.

Step 702: Generate a first interrupt.

When the touch screen detects that the user presses the fingerprint collection area, the first interrupt corresponding to pressing the fingerprint collection area can be generated. When the touch screen detects that the user presses the another area, a second interrupt corresponding to pressing the another area can be generated. The touch screen sends a generated interrupt (for example, the first interrupt or the second interrupt) to a touch screen driver.

It should be noted that a procedure of processing after the touch screen generates the second interrupt is not limited in this embodiment of this application, and only a procedure of processing after the touch screen generates the first interrupt is described.

Step 703: Generate a first pressing event.

The touch screen driver receives the first interrupt sent by the touch screen and generates a first pressing event corresponding to the first interrupt. The first pressing event is for recording that the touch screen detects that the user presses the fingerprint collection area.

Step 704: Send the first pressing event.

The touch screen driver sends the first pressing event to a lock screen management module.

Step 705: Send a display instruction.

The lock screen management module sends the display instruction to a display driver. The display instruction indicates the display driver to highlight the fingerprint collection area. The display driver may highlight the fingerprint collection area by adjusting the fingerprint collection area to a high brightness monitor (High Brightness Monitor, HBM) mode. When the fingerprint collection area enters the HBM mode, original brightness and an original color temperature need to be maintained for a display area outside the fingerprint collection area, to ensure user experience. Otherwise, the user may feel a screen flicker during an unlocking process. If the display driver supports independent drawing of the fingerprint collection area, the display driver only needs to adjust the fingerprint collection area to the HBM mode, without affecting other display areas than the fingerprint collection area. If the display driver does not support independent drawing of the fingerprint collection area, it is necessary to adjust the whole display screen to the HBM mode, and then overlay a mask layer on other display areas than the fingerprint collection area to ensure that the other display areas can maintain their original brightness and color temperature, so that the other display areas are not affected during unlocking.

Step 706: Highlight the fingerprint collection area of the display screen.

In response to the display instruction of the display driver, the fingerprint collection area of the display screen is highlighted to form a fingerprint light spot, to serve as a light source for fingerprint collection.

Step 707: Send display complete information.

After highlighting the fingerprint collection area, the display driver sends the display complete information to the lock screen management module. The display complete information indicates to the lock screen management module that the fingerprint collection area has been highlighted.

Step 708: Send a fingerprint collection instruction.

The display driver receives the display complete information and sends the fingerprint collection instruction to a sensor driver. The fingerprint collection instruction indicates the sensor driver to collect a fingerprint.

FIG. 8A and FIG. 8B are a possible schematic diagram of a procedure of fingerprint collection. As shown in FIG. 8A and FIG. 8B, the procedure includes:

Step 801: Obtain a parameter.

An exposure time estimation module in a sensor driver may receive a fingerprint collection instruction sent by a lock screen management module, and send a parameter collection request to a display driver for requesting a screen brightness related parameter, such as a brightness bar setting order, a DBV order of a display driver IC, an ELVSS voltage, and a display mode.

Step 802: Send the parameter.

The display driver sends a parameter value of the corresponding parameter to the exposure time estimation module in response to the parameter collection request sent by the exposure time estimation module.

Step 803: Obtain an interface.

The exposure time estimation module sends an interface collection request to an interface screenshot module.

Step 804: Send the interface.

The interface screenshot module takes, in response to the interface collection request, a screenshot of an interface currently displayed on a display screen, and sends the obtained interface screenshot to the exposure time estimation module.

It should be noted that when taking the screenshot of the interface currently displayed on the display screen, a screenshot of an interface displayed on the display screen before being processed based on a display mode may be taken, or a screenshot of an interface that is after the display screen is processed based on a display mode (that is, an interface actually displayed on the display screen that a user can watch) may be taken.

Step 805: Calculate first exposure time.

The exposure time estimation module calculates the first exposure time based on the screen brightness related parameter and the interface screenshot. For a specific calculation method, refer to the corresponding explanation in step 403.

Step 806: Send the first exposure time.

The exposure time estimation module sends the calculated first exposure time to an exposure time correction module in the sensor driver.

Step 807: Correct the first exposure time.

The exposure time correction module corrects the first exposure time to obtain second exposure time. For a specific correction method, refer to the corresponding explanation in step 404.

Step 808: Send the second exposure time.

The exposure time correction module sends the second exposure time to a fingerprint collection module in the sensor driver.

Step 809: Collect a fingerprint.

The fingerprint collection module controls a fingerprint collection sensor to receive light based on the second exposure time, and generates a fingerprint image based on the received light.

Step 810: Detect exposure of the fingerprint image.

The fingerprint collection module detects exposure of the fingerprint image, and determines whether the fingerprint image meets a preset exposure condition. If the fingerprint image meets the preset exposure condition, the fingerprint image is successfully collected, and subsequent steps can be performed based on the fingerprint image, such as storing the fingerprint image as a fingerprint template, or comparing the fingerprint image with a fingerprint template for identity authentication. If the fingerprint image does not meet the preset exposure condition, step 811 is performed.

Step 811: Exposure time adjustment request.

When the fingerprint image does not meet the preset exposure condition, the fingerprint collection module sends the exposure time adjustment request to an exposure time adjustment module. The request may include the second exposure time and exposure status information of the fingerprint image. The exposure status information may include, but is not limited to, underexposure, overexposure, and the like.

Step 812: Feedback third exposure time.

The exposure time adjustment module adjusts, in response to the exposure time adjustment request, the second exposure time based on the exposure status information of the fingerprint image to obtain the third exposure time, and sends the third exposure time to the fingerprint collection module. For a specific adjustment method, refer to the corresponding explanation in step 306.

Step 813: Collect a fingerprint.

The fingerprint collection module controls the fingerprint collection sensor to receive light based on the third exposure time, and generates a fingerprint image based on the received light.

Step 814: Detect exposure of the fingerprint image.

The fingerprint collection module detects exposure of the fingerprint image, and determines whether the fingerprint image meets a preset exposure condition. If the fingerprint image meets the preset exposure condition, the fingerprint image is successfully collected, and subsequent steps can be performed based on the fingerprint image, such as storing the fingerprint image as a fingerprint template, or comparing the fingerprint image with a fingerprint template for identity authentication. If the fingerprint image does not meet the preset exposure condition, step 811 may be returned to, and the exposure time is adjusted again.

An embodiment of this application further provides an electronic device. The device includes a storage medium and a central processing unit, where the storage medium may be a non-volatile storage medium. The storage medium stores a computer-executable program. The central processing unit is connected to the non-volatile storage medium and executes the computer-executable program to implement the method provided by any embodiment in FIG. 4 to FIG. 8A and FIG. 8B of this application.

An embodiment of this application further provides an electronic device, including a processor, a memory, and one or more computer programs. The one or more computer programs are stored in the memory, and the one or more computer programs include instructions which, when executed by the device, enable the device to perform the method provided by any embodiment in FIG. 4 to FIG. 8A and FIG. 8B.

An embodiment of this application further provides a computer-readable storage medium. The computer-readable storage medium stores a computer program. When the computer program is run on a computer, the computer is enabled to perform the method provided by any embodiment in FIG. 4 to FIG. 8A and FIG. 8B of this application.

An embodiment of this application further provides a computer program product. The computer program product includes a computer program. When the computer program is run on a computer, the computer is enabled to perform the method provided by any embodiment in FIG. 4 to FIG. 8A and FIG. 8B of this application.

In embodiments of this application, "at least one" means one or more, and "multiple" means two or more. The term "and/or" is a description of an association relationship between associated objects, and means that there may be three types of relationships. For example, A and/or B may mean that A exists alone, both A and B exist, and B exists alone. A and B may be singular or plural. The character "/" usually indicates that associated objects are in an "or" relationship. "At least one of the following" and similar expressions refer to any combination of these items, including any combination of singular or plural items. For example, at least one of a, b and c may mean: a; b; c; a and b; a and c; b and c; or a, b, and c, where a, b, and c may be singular or plural.

A person of ordinary skill in the art can realize that each unit and algorithm step described in embodiments disclosed in this specification can be implemented by electronic hardware or a combination of computer software and electronic hardware. Whether the functions are performed by hardware or software depends on a particular application and a design constraint of the technical solutions. A person skilled in the art can use different methods to realize the described functions for each specific application, but this implementation should not be considered beyond the scope of this application.

A person skilled in the art can clearly understand that, for convenience and conciseness of description, for the specific working processes of the systems, apparatuses and units described above, refer to the corresponding processes in the method embodiments. Details are not described herein again.

In several embodiments provided in this application, any function may be stored in a computer-readable storage medium when being implemented in a form of a software function unit and sold or used as an independent product. Based on this understanding, the essence of the technical solutions of this application, a part that contributes to the prior art, or a part of the technical solutions may be embedded in a form of a software product. The computer software product is stored in a storage medium and includes several instructions to make a computer device (which may be a personal computer, a server, a network device, or the like) perform all or part of the steps of the methods described in various embodiments of this application. The storage medium includes various media that can store program code, such as a USB flash drive, a removable hard disk, a read-only memory (Read-Only Memory, ROM for short below), a random access memory (Random Access Memory, RAM for short below), a magnetic disk, or an optical disc.

What is claimed is:

1. A fingerprint-on-display collection method, applied to an electronic device, and comprising:
obtaining a first interface and a screen brightness related parameter, wherein the screen brightness related parameter is a parameter that affects screen brightness in the electronic device, and the first interface is an interface displayed on a screen when fingerprint collection is performed;
calculating first exposure time for fingerprint collection based on the first interface and the screen brightness related parameter; and
performing the fingerprint collection based on the first exposure time to obtain a first fingerprint image.

2. The method according to claim 1, wherein the screen brightness related parameter comprises at least one of: a brightness bar setting order, a display brightness value (DBV) order of a display driver IC, an ELVSS voltage, and a display mode.

3. The method according to claim 1, wherein the performing fingerprint collection based on the first exposure time to obtain a first fingerprint image comprises:
correcting the first exposure time based on a preset correction parameter to obtain second exposure time, wherein the correction parameter comprises exposure time required for a standard product to collect a fingerprint when a fingerprint light spot is brightest, exposure time required for the standard product to collect a fingerprint when a fingerprint light spot is darkest, exposure time required for the electronic device to collect a fingerprint when a fingerprint light spot is brightest, and exposure time of the electronic device when a fingerprint light spot is darkest; and
performing fingerprint collection based on the second exposure time to obtain the first fingerprint image.

4. The method according to claim 3, wherein the method further comprises:
detecting an exposure degree of the first fingerprint image;
when it is determined based on the exposure degree that exposure of the first fingerprint image is inappropriate, adjusting the second exposure time to obtain third exposure time; and
performing fingerprint collection based on the third exposure time to obtain a second fingerprint image.

5. The method according to claim 2, wherein the screen brightness related parameter comprises the brightness bar setting order, the DBV order of the display driver IC, the ELVSS voltage, and the display mode; and the calculating first exposure time based on the first interface and the screen brightness related parameter comprises:

mapping an RGB value of each pixel in the first interface into a new RGB value according to a mapping rule corresponding to the display mode; and
calculating the first exposure time based on the new RGB value of each pixel, the brightness bar setting order, the DBV order of the display driver IC, and the ELVSS voltage.

6. The method according to claim 5, wherein the calculating the first exposure time based on the new RGB value of each pixel, the brightness bar setting order, the DBV order of the display driver IC, and the ELVSS voltage comprises:
calculating the first exposure time by using a following formula:

$$t = \frac{k_r}{N}\sum_{i=1}^{N} LR_i + \frac{k_g}{N}\sum_{i=1}^{N} LG_i + \frac{k_b}{N}\sum_{i=1}^{N} LB_i + k_1 L_{ev} + k_2 L_{dbv} + k_3 V_{elvss} + b$$

wherein t is the first exposure time; $k_1$, $k_2$, $k_3$, $k_r$, $k_g$, and $k_b$ all are preset coefficients; $LR_i$ represents a new R value of an $i^{th}$ pixel, $LG_i$ represents a new G value of the $i^{th}$ pixel, $LB_i$ represents a new B value of the $i^{th}$ pixel; N is a total number of pixels in the first interface; $L_{ev}$ represents the brightness bar setting order; $L_{dbv}$ represents the DBV order of the display driver IC; $V_{elvss}$ represents the ELVSS voltage; and b is a preset constant.

7. The method according to claim 3, wherein the correcting the first exposure time based on a preset correction parameter to obtain second exposure time comprises:
correcting the first exposure time according to a following formula to obtain the second exposure time:

$$\frac{t_1 - t_{min\_cal}}{t_{max\_cal} - t_{min\_cal}} = \frac{t - t_{min\_std}}{t_{max\_std} - t_{min\_std}}$$

wherein t is the first exposure time; $t_1$ is the second exposure time; $t_{min\_std}$ is the exposure time required for the standard product to collect a fingerprint when the fingerprint light spot is brightest, $t_{max\_std}$ is the exposure time required for the standard product to collect a fingerprint when the fingerprint light spot is darkest, $t_{min\_cal}$ is the exposure time required for the electronic device to collect a fingerprint when the fingerprint light spot is brightest, and $t_{max\_cal}$ is the exposure time required for the electronic device to collect a fingerprint when the fingerprint light spot is darkest.

8. The method according to claim 4, wherein the adjusting the second exposure time comprises:
shortening the second exposure time when it is determined based on the exposure degree that the first fingerprint image is overexposed; or
prolonging the second exposure time when it is determined based on the exposure degree that the first fingerprint image is underexposed.

9. An electronic device, comprising:
one or more processors, a memory, and one or more computer programs, wherein the one or more computer programs are stored in the memory, and the one or more computer programs comprise instructions which, when executed by the one or more processors, enable the electronic device to perform operations comprising:
obtaining a first interface and a screen brightness related parameter, wherein the screen brightness related parameter is a parameter that affects screen brightness in the electronic device, and the first interface is an interface displayed on a screen when fingerprint collection is performed;

calculating first exposure time for fingerprint collection based on the first interface and the screen brightness related parameter; and performing the fingerprint collection based on the first exposure time to obtain a first fingerprint image.

10. A computer-readable storage medium, wherein the computer-readable storage medium stores instructions; and when the instructions are run on a computer, the computer is enabled to perform operations comprising:

obtaining a first interface and a screen brightness related parameter, wherein the screen brightness related parameter is a parameter that affects screen brightness in the electronic device, and the first interface is an interface displayed on a screen when fingerprint collection is performed;

calculating first exposure time for fingerprint collection based on the first interface and the screen brightness related parameter; and performing the fingerprint collection based on the first exposure time to obtain a first fingerprint image.

* * * * *